March 14, 1950 N. C. POWERS 2,500,202
METHOD OF AND APPARATUS FOR REFRIGERATING
Filed June 7, 1947 4 Sheets-Sheet 2

Inventor
Norman C. Powers
Attorney

Patented Mar. 14, 1950

2,500,202

UNITED STATES PATENT OFFICE 2,500,202

METHOD OF AND APPARATUS FOR REFRIGERATING

Norman C. Powers, Elkhart Lake, Wis.

Application June 7, 1947, Serial No. 753,172

20 Claims. (Cl. 62—177)

This invention relates to the art of refrigeration and refers particularly to a method and system or apparatus for effecting heating and/or cooling in a manner which utilizes the heat energy ordinarily wasted in refrigeration systems heretofore available.

Refrigeration systems heretofore known utilized the principles of either absorption, motor driven compression or steam jet action as the refrigerant moving means. Each of these previously known principles of refrigerant propulsion entails a waste of heat energy. It is this waste which the present invention seeks to overcome.

To this end, this invention has as one of its objects the provision of an improved refrigerating method and apparatus whereby refrigeration is accomplished by a process of evaporation and condensation effected by jet action rather than mechanical means, and in such a manner as to minimize heat energy loss by returning to the prime energy source a large portion of the heat which would normally be dissipated into waste so that such heat energy is reclaimed for reuse as a means of motive power in the refrigerating system.

Another object of this invention is to combine in a single unit the functions of refrigeration and heating, and to achieve these functions with low consumption of fuel or electric power and without the energy waste which characterizes refrigeration systems heretofore known.

By reversing the cycle of operation refrigeration systems have been and are being used for heating purposes. As indicated, the present invention likewise contemplates heating as well as cooling or refrigeration, but distinguishes from conventional reverse cycle operation in that the same heat exchanger may be used for both heating and/or cooling, and distinguishes from such schemes as shown in U. S. Letters Patent No. 2,083,159 issued to Ralph C. Rowe, June 8, 1937, wherein the same radiator may have heating or cooling fluid circulated through it, by virtue of the fact that in the present invention the refrigerant itself is circulated through the radiator or other appropriate heat exchanger.

It is, therefore, another object of this invention to provide an improved refrigerating method and apparatus which enables modification or temperature conditioning of an objective (which may be the air within or flowing to an enclosed space or even solids) by means of a single heat exchanger appropriately located with respect to the objective, and which forms part of a single closed circulatory system through which a single refrigerant circulates.

Another object of this invention is to provide an improved refrigeration method and apparatus wherein heat transfer is effected either into or out of enclosed or other space without mechanical pumps.

A further object of this invention is to provide an efficient refrigerating and/or heating apparatus which is inexpensive to produce and compact in structure so that it lends itself readily to uses and installations where heretofore temperature conditioning was not economically practicable.

With the above and other objects in view which will appear as the description proceeds, this invention resides in the improved method and novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate one complete example of the physical embodiment of the invention constructed in accordance with the best mode so far devised for the practical application of the principles thereof, and in which.

Figure 1:
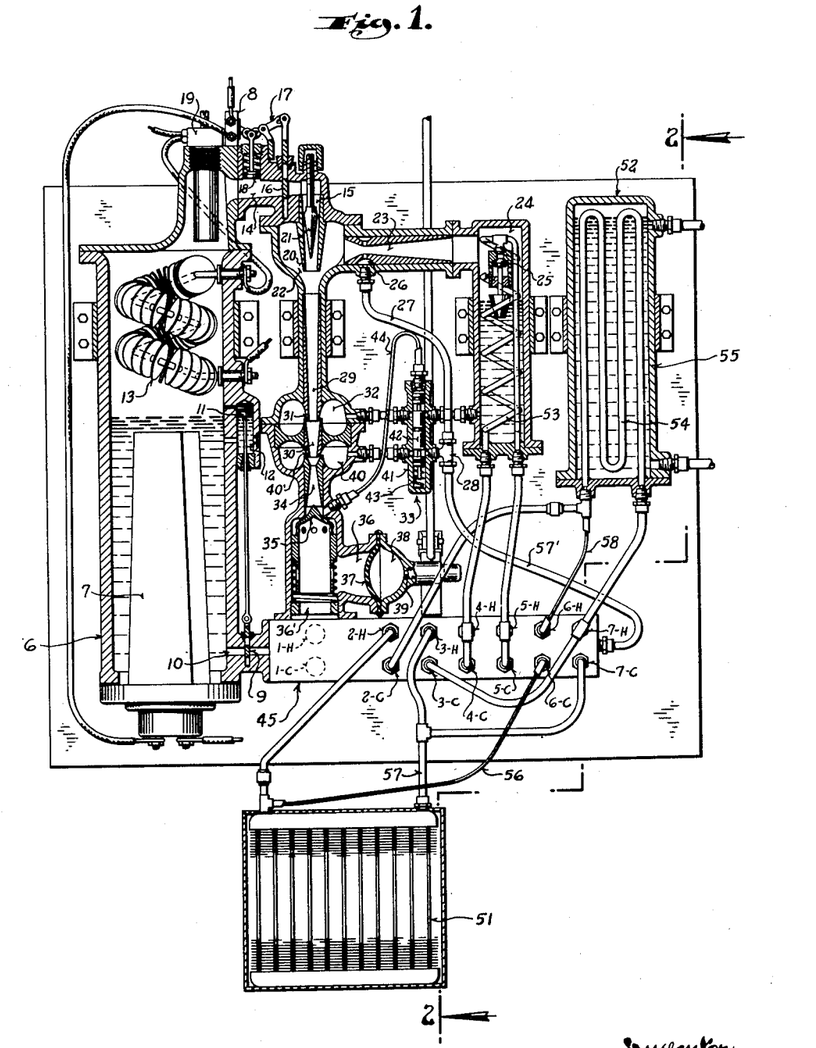
Figure 1 is a view partially in elevation and partially in section illustrating the structural aspect of one embodiment of this invention.
Figures 2, 5:
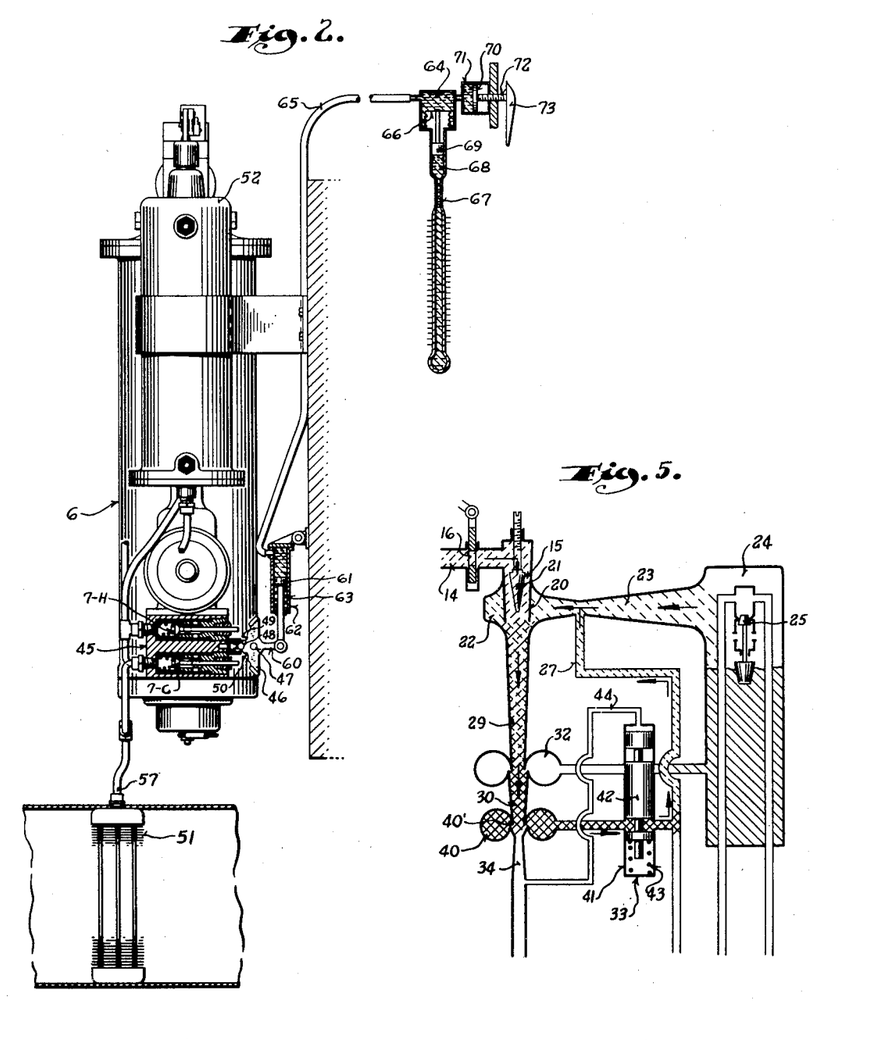
Figure 2 is a view partially in end elevation and partially in section taken on the plane of line 2—2 in Figure 1 and illustrating particularly one manner of effecting automatic control of the apparatus.
Figure 5 is a diagrammatic view of that portion of the system involved in the starting cycle.

Referring now particularly to the accompanying drawings and especially to Figures 1 and 2 wherein the structural aspect of the invention is illustrated, the numeral 6 designates generally a power cell or boiler which provides the primary energy source, and wherein liquid refrigerant is evaporated into gas under pressure by the application of heat.

Various refrigerants may be used either singly or in combination or solution; to mention a few: water, carrene, various types of Freon, a number of chloral hydrocarbons, hydrocarbons, aliphatic derivatives, esters, alcohols—in fact any substance known to the refrigerating industry and art as a refrigerant could be used. However, trichloromonofluoromethane (Freon 11) is especially satisfactory, due to its excellent chemical and physical properties.

Any source of heat may be used, but an electric heating element 7 mounted inside the boiler or cell is preferable. This heating element is connected with a source of electric current through a switch 8 which is controlled from the pressure within the boiler or power cell in the manner to be described.

A relatively constant liquid level, at least to the top of the heating element 7, is maintained in the boiler or power cell by a float actuated valve 9 connected in an inlet port 10 leading to the lower portion of the boiler. The float control 11 for this valve operates in a chamber 12 communicated with the interior of the boiler or cell.

As heat is applied to the liquid refrigerant by the heater element 7, it boils into a vapor which then passes over a superheating element 13 in the upper portion of the boiler or cell. When super-heated to the point required for isentropic expansion, the gaseous refrigerant leaves the boiler or power cell through a delivery port 14 which connects with a power nozzle 15.

The heat characteristics of the gas leaving the pressure cell are controlled by regulating the switch 8 and a valve 16 which regulates the delivery port. Linkage indicated generally by the numeral 17 connects the valve 16 and the movable element of the switch 8 with a piston 18 operating in a cylinder which communicates with the interior of the power cell or boiler at the delivery port. The pressure within the boiler is thus manifested on the piston which is spring loaded to hold the valve closed.

When the pressure within the power cell or boiler falls below a pre-determined limit, the spring loading of the piston 18 acting through the linkage 17 closes the valve 16 and the electric heater switch 8. Closure of the electric heater switch 8 turns on the electric power to the heater element 7 producing a greater volume of heat and subsequently more rapid expansion of the liquid refrigerant with a corresponding rise in gas pressure. As pressure builds up in the power cell, the piston 18 moves upwardly against its spring loading and when moved sufficiently, opens the valve 16 to permit the heated gas to pass through the delivery port.

A separate super-heat thermo switch 19 responsive to the temperature of the gas within the boiler is provided to control the super-heater element 13 and maintain the gas heat content at relatively constant temperature.

In the event the pressure of the gas within the boiler rises above a predetermined maximum, the resulting additional upward movement of the piston 18 actuates the movable element of the heater switch 8 to cut off the supply of current to the heater and thereby effect a consequent reduction in rate of evaporation from the boiling liquid refrigerant which, of course, results in a reduction in pressure.

It should be noted that inasmuch as the function of the boiler or power cell is merely to produce super-heated gaseous refrigerant at approximately 100 p. s. i. in the case of Freon 11 and to maintain a relatively constant gas flow, any other means producing these effects may be used.

As noted hereinbefore, the delivery port 14 leads to a power jet or nozzle 15 which is thus supplied with gaseous refrigerant at constant pressure and uniform heat content. While this power jet may comprise any type of divergent nozzle, in the present instance it is constructed as an elongated tube 20 with a small internal taper, as for instance one-half degree (½°), the small end being the outlet. Within this tube 20 is an axially adjustable metering pin 21. This pin is so contoured that it and the tube coact to produce a convergent-divergent nozzle. By virtue of the internal taper of the nozzle 20, axial adjustment of the metering pin enables adjustment of the nozzle orifice to achieve the most efficient nozzle flow.

As gas is delivered to the nozzle 15 it accelerates and expands isentropically to lower pressure in the convergent end of the nozzle. After passing through the throat of the jet acceleration continues to a maximum velocity, preferably just below the acoustical velocity of the gas being expelled, which is in excess of 1200 feet per second in the case of Freon 11.

The power nozzle 15 discharges into a vacuum chamber 22 which is coupled by an interconnecting venturi 23 with the interior of a super cooler 24. The super cooler 24 contains liquid refrigerant maintained at a relatively constant level by a float controlled valve 25, the communication between the vacuum chamber 22 and the interior of the super cooler 25 being above the liquid level in the latter.

By virtue of the ejector action of the power nozzle 15 creating a vacuum within the chamber 22, the pressure within the super cooler 24 is reduced. This reduction in pressure within the super cooler 24 causes the liquid therein to boil and vaporize. Thus, when the power nozzle is in operation it creates a partial vacuum which will be transmitted to the venturi 23 to draw off vapor present in the super cooler 24, and entrain such vapor in the gaseous stream. The vacuum effect within the venturi 23 will also draw off any vapor present in a small annular chamber 26 surrounding the throat of the venturi 23. This small annular chamber is connected by a line 27 with a vacuum connection 28 which is in turn connected with other parts of the system to be hereinafter described.

Vapors drawn off from the super cooler and the annular chamber 26 will be entrained in the gaseous stream issuing from the power nozzle 15, and the resultant stream of mixed vapor and gas continues into and through a nozzle 29. Due to the fact that the vapor and gas flowing through the nozzle 29 have the same chemical characteristics but are of different physical properties in that heat content, density and temperatures are different, a small amount of condensation takes place therein. To compensate for the resulting decrease in volume the nozzle 29 is made slightly convergent so that the velocity of the stream through the nozzle remains substantially constant.

The nozzle 29 debouches into a mixing nozzle 30, the inlet end of which communicates, through a small annular opening 31, with an annular chamber 32. This chamber 32 is connected with the super cooler 24 below the liquid level therein. The connection between the chamber 32 and the super cooler is controlled by a starting valve indicated generally by the numeral 33.

When the device is in operation, cold liquid refrigerant from the super cooler may be drawn directly into the chamber 32 for admixture with and entrainment by the stream entering the mixing nozzle 30.

During its passage through the mixing nozzle 30 the resultant stream condenses. The action which occurs at this point is somewhat similar to that which obtains in the ejector type of boiler feed.

The action which is produced in the mixing nozzle 30 occurs largely due to the fact that condensation is as much a function of temperature as of pressure. The dry, or substantially dry relatively hot gaseous refrigerant being admixed with the wet liquid refrigerant from the super cooler brings about a condensation or liquification of the gaseous refrigerant by a reduction of the temperature of the gas while its kinetic energy continues to impel the condensed liquid forward.

The heat interchange between the refrigerant gas and the cold liquid refrigerant is in such proportion that the gas becomes condensed while the liquid is warmed. The average heat content is thus approximately at the liquid saturation line as indicated by Mollier charts for the type of refrigerant being used.

The mixing process taking place within the nozzle 30 produces a reduction in volume of the gas. Therefore, in order to maintain the velocity of the stream the cross sectional area of the mixing nozzle 30 is progressively reduced. The mixed fluid, now in a liquid condition, thus continues at high velocity through the mixing nozzle 30 and into a convergent-divergent nozzle 34 which may be considered the delivery jet.

At the time the stream enters the nozzle or jet 34 it is flowing at its maximum velocity which, as noted hereinbefore, is preferably just below its acoustic velocity. Within this nozzle or delivery jet 34 the stream undergoes deceleration.

The pressure energy originally imparted to the gas and liquid, which became manifested as kinetic energy during expansion, must now reappear in the liquid being decelerated in the delivery jet. In other words, the kinetic energy which characterized the high velocity stream entering the nozzle or delivery jet 34 is converted into static pressure energy as its velocity is decelerated. Thus the liquid refrigerant issuing from the nozzle or delivery jet 34 will have a pressure in excess of the boiler pressure in accordance with the well known phenomenon of injector action.

At this increased pressure the liquid from the jet 34 reacts upon a surge plate or spring loaded valve 35 to unseat the same and permit the stream to flow into a pressure chamber or accumulator 36.

One wall of the accumulator chamber is defined by a yieldable diaphragm 37 which divides the accumulator chamber from a cushioning chamber 38. Air under pressure is introduced into the chamber 38 in any suitable manner through a port 39 provided with a suitable check valve. By virtue of this construction the accumulator may store varying quantities of liquid under pressure.

The surge plate or spring loaded valve 35, as will be readily apparent, acts as a one-way valve which permits the liquid to flow into the pressure accumulator chamber 36 but prevents back flow thereof to the delivery jet when the power nozzle is not operating.

The starting valve assembly 33, which is connected between the super cooler 24 and the mixing chamber 32, is also connected between an annular vacuuming chamber 40 and the vacuum fitting 28. The annular vacuuming chamber 40 surrounds the discharge end of the nozzle 30 and the inlet end of the jet 34 with both of which it is communicated through an annular orifice 40'. Thus, when the starting valve 33 is in its starting position, shown in Figure 1, vacuum manifested in the fitting 28 by virtue of its connection with the throat of the venturi 23 serves to draw any fluid contained in the chamber 40 and in the nozzles back into the power nozzle.

Structurally, the starting valve assembly 33 may take any suitable form, but as illustrated, it comprises a cylinder 41 in which a piston 42 is slidably mounted. The piston is yieldingly biased to a starting position by a spring 43 and in this position closes off communication between the chamber 32 and the super cooler, but establishes communication between the vacuuming chamber 40 and the vacuum line.

Thus, when the power nozzle is starting, the liquid feed from the super cooler will be stopped, while the passage between the vacuuming chamber 40 and the vacuum delivery port at the venturi 23 will be open to allow any liquid in the nozzles to be drawn off. This will cause the expanded gas to recirculate through the nozzle 29, the mixing nozzle 30, the vacuuming chamber 40 and the vacuum delivery line 27 to the venturi 23 and thus into the suction chamber 22 of the ejector, until such time as the gases from the power nozzle are traveling at sufficient velocity to effect a pressure in the delivery nozzle 34 sufficient to unseat the surge plate or valve member 35.

When the pressure on the surge plate reaches this value, the piston 42 of the starting valve assembly is forced down against its spring 43 by virtue of the duct 44 connecting the top of the cylinder 41 with the chamber into which the jet nozzle 34 discharges. Response of the piston 42 to this pressure opens the communication between the chamber 32 and the super cooler 24 and closes the connection between the vacuum line and the chamber 40. As long as the system is in operation, that is, the power nozzle is being supplied with gaseous refrigerant at the required pressure, the piston of the starting valve assembly occupies this latter position which is illustrated in Figure 5.

From the description thus far, it will be seen that the series connected ejector and injector jets produce a partial vacuum and low temperature in the super cooler 24, and a high pressure and high temperature in the pressure accumulator chamber 36. The pressure and temperature differential between the two chambers 24 and 36 is utilized, by means of secondary circuits, to effect either refrigeration or heating as required to maintain a pre-determined temperature condition in or at the objective being served by the apparatus. To this end the pressure accumulator chamber 36 is directly interconnected with a manifold valve assembly indicated generally by the numeral 45 which distributes the high temperature, high pressure liquid to the secondary circuits to effect either refrigeration or heating as determined by the setting of the valves of the manifold 45.

Specifically, the outlet 36' of the chamber 36 communicates with two valves, I—H and I—C of the manifold. The latter leads to the inlet port 10 of the boiler or power cell as well as to the secondary circuits. Hence some of the high pressure, high temperature liquid from the accumulator chamber 36 may be directed back into the boiler or power cell through the port 10 (if the float valve 9 is open) while the remainder is directed into the secondary circuits. It is, of course, to be understood that the static pressure of the liquid in the accumulator chamber 36 exceeds that which obtains in the boiler or power cell.

The manifold valve assembly 45 comprises a series of valves similar to the valves 1—H and 1—C arranged in pairs designated 2—H and 2—C to 7—H and 7—C inclusive. These valves, which may be of any suitable type, and in the present instance have been shown as normally closed poppet valves, are so disposed with respect to each other that all the H valves may be opened simultaneously without disturbing the C valves, and conversely all of the C valves may be opened simultaneously without disturbing the H valves.

Figure 2 illustrates one manner of effecting such simultaneous opening of either the H or C valves. As here shown, a rocker arm 46 is mounted on a rock shaft 47 in line with each pair of valves. Being fixed to the shaft 47 all of the rocker arms 46 rotate in unison. A spring pressed ball detent 48 yieldingly holds the rocker assembly in the neutral position shown in full lines in Figure 2, at which all of the valves are closed. Rocking the shaft 47 opens one or the other set of valves, depending upon the direction in which the shaft is rocked. If rocked in a counter-clockwise direction the ball detent snaps into a recess 49 to restrain the rocker assembly in its position holding all of the C valves open, while rotation in the clock-wise direction engages the ball detent with a recess 50 to restrain the rocker assembly in a position holding all of the H valves open.

The manner in which the shaft 47 is rocked automatically to effect control of the valves will be hereinafter described.

Figure 3:
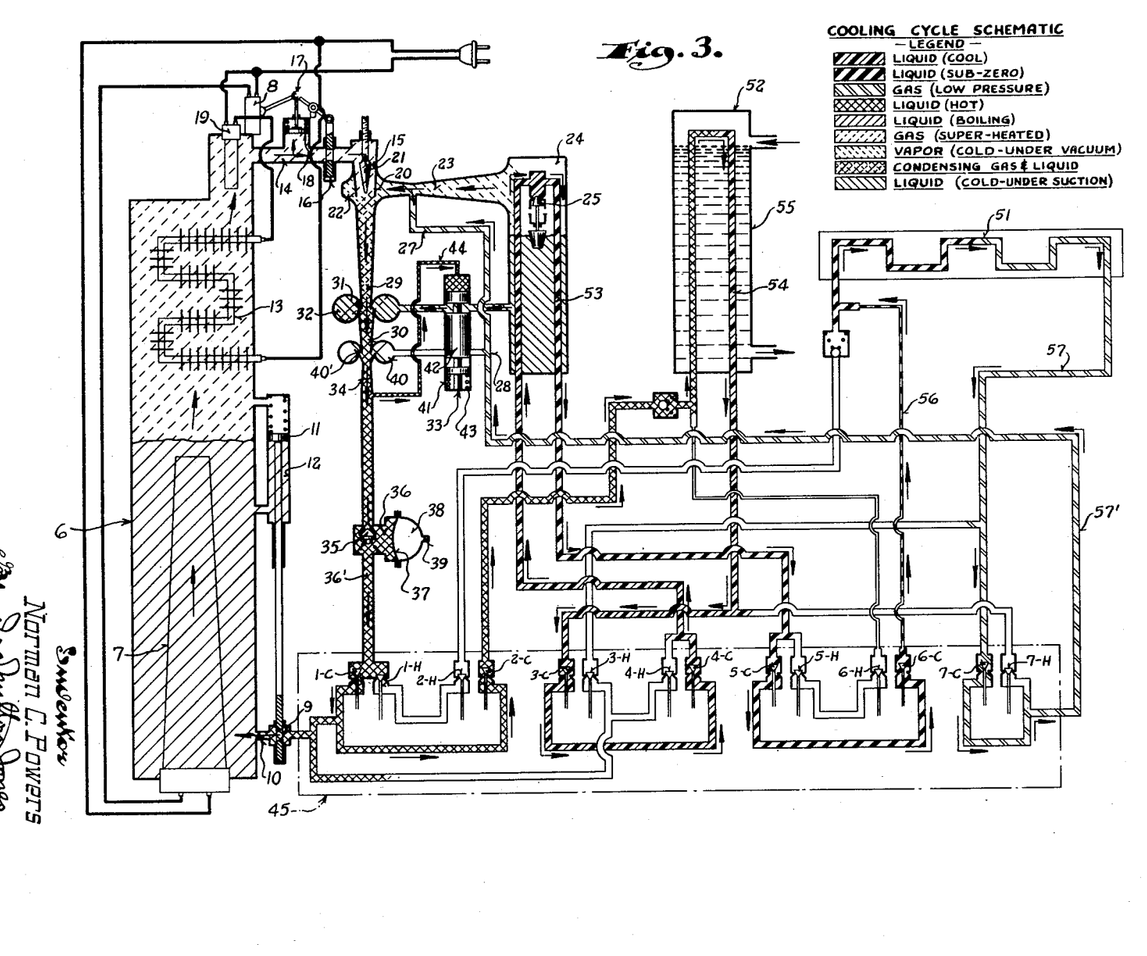
Figure 3 is a schematic diagram illustrating the manner in which this invention effects cooling.
Figure 4:
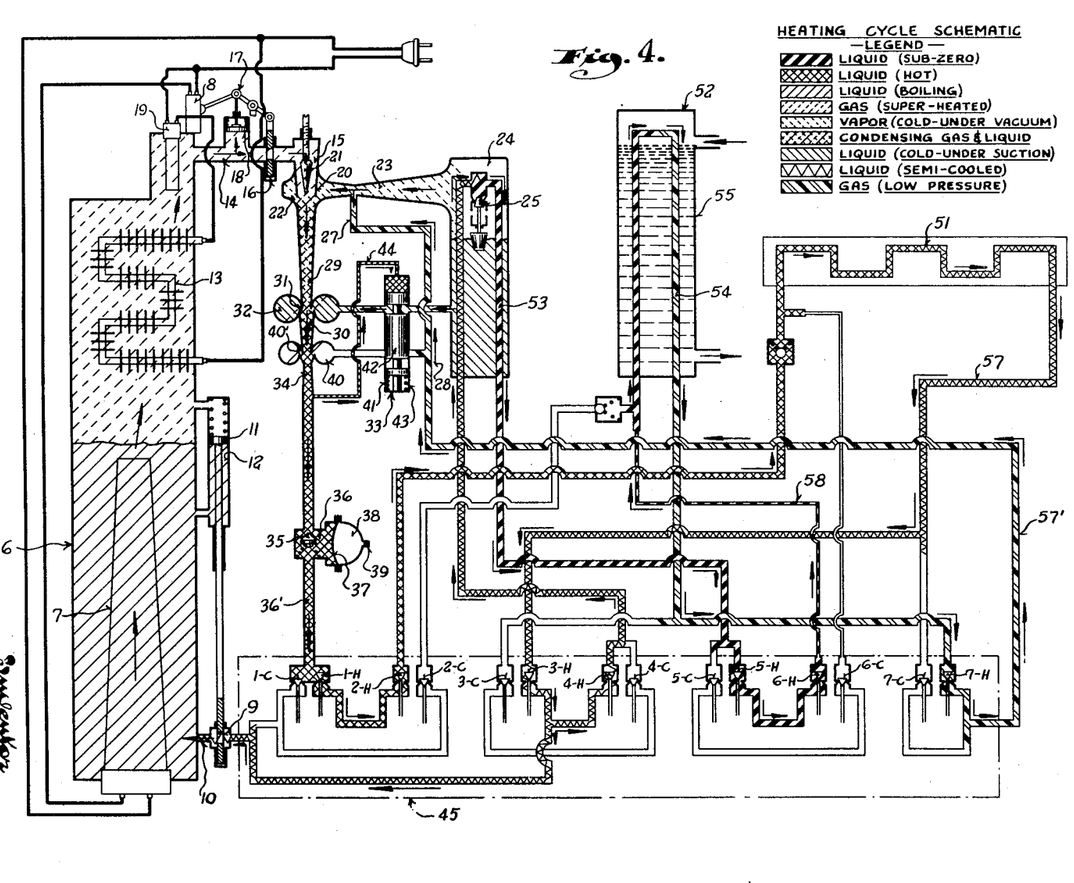
Figure 4 is a similar schematic diagram showing the way in which heating is effected.

Depending upon the position of the valves in the manifold 45, the high temperature, high pressure liquid from the accumulator chamber 36 takes either of two paths through the closed circuits shown in Figures 3 and 4, to effect either cooling or heating, and in addition a portion thereof is returned to the boiler at the dictation of the float controlled valve 9. The circuits through which the refrigerant flows from the accumulator chamber 36 include a heat tempering coil or heat exchanger 51, a heat equalizer unit 52, and a coil 53 in the super cooler 24.

The tempering coil or heat exchanger 51 is positioned to effect the desired temperature modification of the objective. Thus, if the apparatus is being used to temperature condition the air in a room, the heat exchanger 51 might be located in the room itself or in a duct supplying air to the room. On the other hand, if the apparatus is being used for refrigeration, the heat exchanger 51 would be located in the refrigerator cabinet.

The heat equalizing unit 52 serves as a heat absorber if the system is operating on the heating cycle and as a heat dissipator if the system is operating on the cooling cycle. Hence, this unit may be merely a coil 54 mounted in heat exchange relation with a fluid of substantially constant temperature as for instance the water in a well, the city water main, or the sewer. In the embodiment illustrated, the coil 54 is inside a tank 55 through which cold water from any suitable source is circulated.

The cooling cycle

On the cooling cycle, which is illustrated in the diagram, Figure 3, the liquid refrigerant is evaporated in the pressure cell or boiler 6, superheated for isentropic expansion by passing over the heater element 13, and then after passing the control valve 16, is projected into a high velocity stream by the power nozzle 15. The stream issuing from the power nozzle pulls a vacuum in the venturi 23 to reduce the pressure within the super cooler 24 and entrain vaporous refrigerant from the super cooler, as brought out hereinbefore.

The gaseous stream then continues on through the nozzle 29 to entrain cold liquid from the chamber 32 and enter the mixing nozzle 30. With the admixture of the cold liquid refrigerant condensation or liquification of the gaseous refrigerant occurs so that the stream issuing from the delivery jet 34 is a liquid.

As the stream passes through the divergent discharge portion of the nozzle or jet 34, it is decelerated and its kinetic energy is converted into static pressure manifested on the walls of the pressure accumulator chamber 36 into which the delivery jet 34 debouches. The chamber 36 thus constitutes the zone of greatest pressure of the entire system and the liquid therein is at a high temperature.

From the chamber 36 the hot liquid refrigerant passes through the open valve 1—C so that a portion thereof will be returned to the boiler or pressure cell, providing the valve 9 is open, while the remainder is directed through the open valve 2—C to the coil 54 of the equalizer unit 52. At this point the hot liquid is cooled by the fluid cooling medium circulating through the tank 55. A large portion of the total heat in the liquid refrigerant is thus transmitted by conduction to the fluid cooling medium so that the refrigerant is cooled down to approximately the temperature of the cooling medium. This condition is graphically illustrated on the diagram, Figure 3, by a change in the legend used to designate the characteristics of the refrigerant.

Inasmuch as the application of the legends to the diagrams of Figures 3 and 4 is obvious, no further reference will be made thereto.

The refrigerant leaving the coil 54 is a cool liquid and as such it flows through series connected valves 3—C and 4—C to the coil 53 in the super cooler. Here it is cooled to subzero temperatures by the cold liquid refrigerant surrounding the coil. A portion of the refrigerant flowing through the coil 53 discharges through the float controlled spray valve 25 to maintain the liquid level within the super cooler, while the main body of the now cold liquid refrigerant continues through the coil 53 and is allowed to pass the open series connected valves 5—C and 6—C into a capillary tube 56 which leads to the tempering coil or heat exchanger 51.

The fluid thus delivered to the tempering coil or heat exchanger 51 is a very cold liquid.

The other side of the tempering coil or heat exchanger 51 has a vacuum line 57 connected thereto which leads to valve 7—C and from there a line 57' leads to the vacuum fitting 28 which, in turn is connected through line 27 with the annular passage 26 surrounding the throat of the venturi 23. Hence the vapors formed by evaporation in the tempering coil or heat exchanger 51 pass directly into the annular vacuum delivery passage 26 and thence into the suction chamber 22 of the ejector.

Refrigeration is accomplished by the tempering coil or heat exchanger 51 by the fact that the air passing over the coil will release its heat to the heat transfer fins on the coil or exchanger in the manner common to refrigeration. Because the vacuum from the venturi 23 is manifested within the coil or exchanger 51, the liquid refrigerant supplied to the coil will be at low pressure. It will therefore boil and release the heat gained from the air into latent heat of evaporation, with the result that the air passing over the coil 51 will be cooled.

Inasmuch as the heat abstracted from the air will be conveyed by the vaporous refrigerant to the ejector vacuum chamber 22 as latent heat it will subsequently appear as re-heat in the pressure chamber 36.

*The heating cycle*

From reference to Figure 4, it will be seen that the same elements used for refrigeration are also used for heating, but the flow of the refrigerant takes a different path. Also, for heating, the functions of the equalizer unit 52 and the tempering coil or exchanger 51 are reversed. It should also be noted that the position of the valves of the manifold valve assembly 45 must be reversed from that which obtains during the cooling cycle. Thus all of the H valves are open, while all of the C valves are closed.

To follow the heating cycle, hot liquid refrigerant under pressure flows from the pressure accumulator chamber 36 through valve 1—H which is in series with valve 2—H, and which in turn is directly connected with the tempering coil or heat exchanger 51. Thus the liquid which flows into the tempering coil or heat exchanger 51 is at a relatively high temperature. In its passage through the tempering coil, it gives off some of its heat so that the liquid leaving the coil 51 is partially cooled. It then passes through line 57 to valve 3—H.

From this point a portion of the liquid is discharged back into the pressure cell or boiler providing the valve 9 is open, while the remainder is routed back to the super cooler coil 53 by way of valve 4—H.

In the super cooler a portion of the liquid is released through the float controlled valve 25 while the remainder passes on as a super cooled liquid through valves 5—H and 6—H into a capillary tube 58 which delivers a metered amount of the super cooled liquid to the coil 54 of the heat equalizer unit 52. In this case, the unit 52 functions as an evaporator and the cold liquid refrigerant absorbs heat from the cooling medium by evaporation under vacuum. The refrigerant leaving the coil 54 of the unit 52 is a gas at low pressure but containing the heat absorbed from the cooling medium circulating through the tank 55. This gas is transmitted through valve 7—H and line 57' to the venturi 23, thus completing the circuit.

*Automatic control*

As will be readily apparent, any specified temperature within the capacity of the apparatus can be maintained at the heat exchanger 51 through the control of the valves in the manifold 45. These valves may be controlled manually but preferably are actuated automatically, and Figure 2 illustrates one way in which such automatic actuation can be obtained. Thus as here shown an arm 60 fixed with respect to the shaft 47 is connected to the piston 61 of a control cylinder 62.

A compression spring 63 yieldingly urges the piston into the cylinder and tends to rock the shaft 47 counter-clockwise. The force of the spring is opposed by a hydraulic fluid above the piston and in a hydraulic pressure pump 64 connected with the cylinder by a duct 65. Thus displacement of fluid from the pump 64 acts against the pressure of the spring 63 to rock the shaft 47 in a clockwise direction, and vice versa.

One wall of the pump 64 is defined by an expansible Sylphon bellows 66. These bellows are adapted to be expanded and contracted by the action of a thermometer 67. To this end, the thermometer includes an expansible bulb 68 which bears against a piston 69 connected to the movable end of the Sylphon bellows. Expansion and contraction of the fluid contained within the thermometer and its expansible bulb 68 thus extends and collapses the Sylphon bellows to decrease and increase the volume of the pump chamber 64. Such variations in the volume of the pump chamber 64 are, of course, manifested in the cylinder 62 to effect movement of its piston in a manner to actuate the rock shaft 47.

Where the volume of the pump chamber 64 has been decreased by expansion of the fluid in the thermometer, the hydrostatic pressure thus developed above the piston of the cylinder 62 rocks the shaft 47 in a clockwise direction to open all of the C valves, thus placing the apparatus in its condition for cooling, as diagrammatically illustrated in Figure 3. Hence the temperature of the objective, and to which the thermometer is subject, will be lowered, thereby restoring the volume of the pump chamber 64 to what it was before the temperature rise at the objective which effected its reduction.

On the other hand, if the temperature of the objective falls below the pre-determined value, the consequent shrinkage of the fluid in the thermometer results in an increase in the volume of the pump chamber 64, thereby allowing the spring 63 to force the piston of the cylinder 62 outwardly and thus rock the shaft 47 in a counter-clockwise direction until the rocker arms 46 on the shaft open all of the H valves. The opening of the H valves places the apparatus in condition to effect heating and thereupon the temperature of the objective is again brought back to its pre-determined norm.

The temperature to be maintained by this automatic control may be set by varying the volume of the fluid system including the cylinder 62 and pump 64, as for instance, by means of a piston 70 operating in a cylinder 71. The piston 70 is adapted to be moved in and out of the cylinder by a screw 72 on which an indicating lever or handle 73 is mounted. Turning the handle in one direction withdraws the piston 70 to increase the volume of the fluid system, while rotation of the handle in the opposite direction forces the piston 70 into the cylinder to decrease the volume of the fluid system.

From the foregoing description taken in connection with the accompanying drawings, it will be apparent to those skilled in this art that this invention combines in a single apparatus both the heating and cooling functions necessary to maintain an objective at any selected pre-determined temperature, and that the simplicity of the apparatus allows the same to be produced at a cost far less than that of refrigerating and heating systems heretobefore available.

It will also be evident to those skilled in the art that this invention provides a method of refrigerating and heating of such high efficiency that the cost of operation is far lower than that of presently known systems.

It should also be apparent that this invention provides an efficient method of abstracting heat from such mediums as well water, city water mains, and sewers, and that the heat thus abstracted is utilized in an efficient and useful manner.

Those skilled in the art will recognize that the advantages of applicant's invention result largely from the novel manner in which condensation of the gaseous refrigerant is effected, that is, by the entrainment of wet fluid refrigerant, specifically the cold liquid from the super cooler, in the high velocity stream of relatively dry gaseous refrigerant flowing through the series connected nozzles. By this simple expedient, condensation or liquification of the gaseous refrigerant is accomplished, and by the directly subsequent deceleration of the resultant liquid stream, the kinetic energy of the stream is transformed into static pressure.

By virtue of the phenomena which attend the operation of ejector and injector nozzles, the static pressure developed in the accumulator into which the discharge jet 34 debouches, is substantially above the pressure of the dry gaseous refrigerant entering the power nozzle from the boiler.

The pressure which obtains in the accumulator chamber 36, by computation, is approximately 125 p. s. i. where the source pressure is 100 p. s. i., thus providing an adequate head to force the liquid back into the boiler even on the heating cycle where the liquid first circulates through the heat exchanger 51 before it re-enters the boiler.

Not only do the phenomena of ejector and injector action explain the high pressure in the accumulator chamber 36, but they also explain why on the heating cycle the total energy imparted into the system at the boiler and by heat abstraction at the heat equalizer 52 will appear as reheat in the pressure chamber 36.

Thus, on the heating cycle, the amount of heat delivered to the heat exchanger 51 will be substantially higher than that which could be provided by the heating element in the boiler alone. This difference in heat output will be roughly equivalent to the co-efficient of performance in referigation and is obtained by using the apparatus as a refrigerator at the heat equalizer unit 52 and as a direct application heater at the tempering coil 51, with heat being initially supplied to the boiler by its heating element.

As the heat equalizer unit 52 may abstract from the water flowing across it more heat than is initially supplied at the boiler, all heat other than that which is released to the air by the heat exchanger or tempering coil 51, and losses due to radiation, conduction, or mechanical elements and which will not exceed an overall of five percent (5%), is retained in the system. Thus, the apparatus of this invention is a highly efficient heating machine when used as such.

Likewise, when used for cooling or refrigeration, comparable efficiency is achieved inasmuch as all heat gained by refrigerating the air at the tempering coil or heat exchanger 51 is returned directly to the system at the venturi 23.

The heat contained in the gaseous refrigerant and derived from the tempering coil or heat exchanger 51 appears as re-heat in the liquid contained in the pressure accumulation chamber 36 as hereinbefore brought out. As this liquid in the pressure accumulator chamber 36 is at a pressure substantially higher than that which obtains in the boiler, that portion of the liquid which is returned to the boiler will expand to a lower pressure as it enters the boiler and thus relatively little heat will have to be imparted to it to bring its temperature to that of the boiler contents. This represents a saving in power cost when operating the system for refrigeration, as less heat is required from the heating element.

What I claim as my invention is:

1. In the art of refrigeration, that improvement which comprises the steps of: projecting a high velocity stream of gaseous refrigerant along a defined path; converging the stream and thereby increasing its velocity; drawing a liquid refrigerant into the converged stream at a rate sufficient to effect substantially complete liquification of the stream; and diverging the resulting liquid stream to decelerate the same.

2. In the art of refrigeration, that improvement which comprises the steps of: projecting a stream of gaseous refrigerant along a defined path from a source of such refrigerant maintained at a predetermined pressure; converging the stream to increase the velocity thereof and simultaneously reduce the static pressure of the stream; entraining a liquid refrigerant in the converged stream at its point of maximum velocity and minimum static pressure thereafter decelerating the stream of gaseous refrigerant admixed with liquid refrigerant to effect condensation of the gaseous refrigerant while increasing the static pressure of the resultant liquid to a pressure greater than that of the fluid at said source; storing the liquid in an accumulator; and releasing the liquid and returning it to said source at a rate such that the pressure of the liquid in said accumulator is maintained higher than that of the fluid at said source.

3. In the art of refrigeration, that improvement which comprises the steps of: projecting a stream of dry gaseous refrigerant from a source thereof along a defined path; converging the stream; entraining wet fluid refrigerant in the converged stream to effect liquification of the stream; diverging the stream as it is being liquified; decelerating the stream to increase the static pressure of the resultant body of liquid refrigerant; storing the resultant body of liquid refrigerant in an accumulator; directing part of the resultant liquid back to the source of the dry gaseous refrigerant from said accumulator; and circulating the remainder thereof from said accumulator through a closed circulatory system including heat transfer means suitable for refrigeration at a rate such as to maintain the pressure of the refrigerant in the accumulator higher than at any other part of the system.

4. That improvement in the art of refrigeration which comprises the steps of: accelerating vaporous refrigerant at relatively high temperature to a high velocity vaporous stream; entraining vaporous refrigerant at relatively low temperature in said high velocity stream; entraining liquid refrigerant at relatively low temperature in said stream to effect condensation of its vapor content; rapidly decelerating the stream simultaneously with its condensation so that the condensate will comprise a liquid containing as heat and pressure energy the energy initially imparted to the refrigerant stream plus the energy in the entrained refrigerant; storing the condensate in a vessel; and circulating the condensate from said vessel through a closed system at a rate such as to maintain the pressure of the fluid in the vessel higher than at any other point in the system.

5. That improvement in the art of refrigeration, which comprises the steps of: accelerating vaporous fluid at relatively high temperature to a high velocity vaporous stream; creating a low pressure upon a supply of liquid fluid having a relatively low temperature to cause said liquid fluid to boil; entraining vapor from said boiling fluid in said high velocity vaporous stream; entraining liquid fluid from said low temperature supply in said high velocity vaporous stream to effect condensation of the vaporous stream; rapidly decelerating the condensate so that it will comprise a liquid containing as heat and pressure energy the energy initially imparted to the fluid stream plus the energy in the entrained fluid; collecting the condensate in a vessel; and releasing the fluid from said vessel and circulating it through a closed system including heat exchangers at a rate such as to maintain the pressure of the fluid in said vessel higher than that of the fluid elsewhere in the system.

6. In a heat transfer device, the combination of: a boiler adapted to contain a quantity of refrigerant; heating means for said boiler adapted to boil liquid refrigerant therein to a vapor at high temperature and pressure; an injector; means communicating the boiler with said injector to enable vaporous refrigerant from the boiler to be expelled through said injector at high velocity; a vessel adapted to contain refrigerant at sub-atmospheric pressure; means communicating said vessel with said injector so that the high velocity vaporous stream through the injector creates a low pressure in the vessel and entrains refrigerant from the vessel; means defining a divergent passage downstream from the point of such entrainment and into which the stream is adapted to debouch as a condensate to have its kinetic energy converted into heat energy and energy of static pressure, so that the total energy of the condensate will be substantially that initially imparted thereto in the boiler plus energy present in the entrained refrigerant from said vessel; an accumulator into which said divergent passage debouches, adapted to contain such condensate; means defining a restricted outlet from said accumulator whereby said condensate is maintained at a high pressure in said accumulator; and heat exchanger means connected through said last named means with said accumulator to be fed thereby and through which said condensate is adapted to be circulated to have heat energy absorbed therefrom.

7. The device of the preceding claim further characterized by the provision of a metered return passage connecting the accumulator with the boiler and through which condensate is adapted to enter the boiler to maintain a predetermined liquid level therein.

8. A heat transfer system of the character described, comprising: a source of fluid at relatively high temperature and pressure; a nozzle communicating with said source of fluid and from which the fluid is expelled at high velocity as a gas; an ejector through which the nozzle expels the gas in a high velocity stream; a source of fluid at relatively low temperature; duct means connecting said source of low temperature fluid with the ejector so that the high velocity stream through the ejector creates a low pressure at said source of low temperature fluid to cause liquid fluid thereat to boil at relatively low temperatures, and through which evaporated fluid from said source of low temperature fluid flows to be entrained in said high velocity gaseous stream; an injector in series with and downstream from said ejector so that the high velocity stream from the ejector flows through said injector; duct means communicating said source of low temperature fluid with the injector and through which liquid fluid from the low temperature source passes to be entrained in the high velocity stream; and a high pressure accumulator into which said injector debouches and in which the fluid is received from the injector as a condensate having high temperature and high static pressure, the sum of the heat and static pressure energies of the fluid in said high pressure chamber being substantially equal to the energy initially present in the high velocity stream from the nozzle plus that in the fluid entrained from the source of low temperature fluid.

9. In a device for heating and cooling: a vessel for liquid fluid at relatively low temperature; a source of vaporous fluid at relatively high temperature and pressure; a nozzle for accelerating vaporous fluid from said high temperature source into a high velocity vaporous stream; means including an injector through which said high velocity stream flows for creating a low pressure in said vessel to cause fluid therein to boil at relatively low temperature, and for entraining fluid from the vessel in said stream; and high pressure accumulator means into which the injector debouches the stream as a condensate having a total heat and pressure energy which is substantially the sum of the energy initially imparted to the fluid stream plus the energy of the entrained fluid from the vessel.

10. In an apparatus for modifying the temperature of fluid, including a heat exchanger in heat exchange relation with said fluid, a closed refrigerant circulatory system including said heat exchanger and a fluid refrigerant in said circulatory system, means for effecting circulation of the refrigerant through the system comprising: an ejector and an injector connected in series in the closed system; means for heating and raising the pressure of the refrigerant at a point in the system ahead of said series connected ejector and injector; and means for feeding vaporous liquid refrigerant from another point in the system to said ejector and injector; and means into which said injector debouches for maintaining the refrigerant at a pressure higher than its pressure ahead of said ejector and injector.

11. In a refrigerating system; means for transforming liquid refrigerant into a dry gas under pressure; a power nozzle connected with said means for receiving dry gaseous refrigerant therefrom and for projecting the same as a high velocity stream along a defined path; an injector fed by the power nozzle; a source of wet refrigerant; means connecting the injector with said source of wet refrigerant and through which wet refrigerant is drawn into the gaseous stream to effect condensation thereof; means defining a high pressure chamber connected with the outlet of the injector and into which the resulting liquid is discharged; and means defining a restricted outlet from said high pressure chamber whereby the rate of refrigerant flow out of said chamber is such as to maintain the refrigerant therein at a high pressure.

12. A heating and cooling system of the character described, comprising: a source of liquid refrigerant at low pressure and temperature; an accumulator; means for taking refrigerant from said source and forcing it into said accumulator to thereby create the low pressure and temperature at said source and provide high pressure and high temperature refrigerant in the accumulator; a super cooler coil in said low pressure source for exchange of heat between refrigerant flowing through said coil and cold liquid refrigerant in said low pressure source; a heat exchange coil adapted to be placed in heat exchange relation with a fluid extraneous to the system for effecting exchange of heat energy between the extraneous fluid and refrigerant flowing through said coil; a tempering coil for effecting heat exchange between refrigerant flowing therethrough and fluid to be temperature conditioned flowing thereacross; means for restricting the flow of refrigerant from said accumulator to a rate such as to maintain the refrigerant in the accumulator at high pressure; means, including duct means, interconnecting said accumulator, said super cooler coil, said heat exchanger and said tempering coil; and means, including valve means in said duct means, for controlling the flow of refrigerant from said accumulator alternatively, for heating, serially through said tempering coil, said super cooler and said heat exchanger, and for cooling, serially through said heat exchanger, said super cooler coil and said tempering coil.

13. In an air conditioning device of the character described: a super-cooler, including a vessel for liquid refrigerant and a heat exchange coil in said vessel immersed in the liquid refrigerant and through which refrigerant is adapted to flow; a source of gaseous refrigerant at high temperature and high pressure; means including a nozzle for accelerating gaseous refrigerant from said source to a high velocity stream; means including an ejector connected with the super-cooler vessel and through which said stream flows for simultaneously effecting a low pressure in said super-cooler vessel to cause boiling of the refrigerant therein and for educting vaporous refrigerant from said vessel into the high velocity stream; means including an injector through which the stream flows for educting liquid refrigerant into said high velocity stream to effect condensation thereof and subsequent rapid deceleration of the condensate to convert its kinetic energy to static pressure energy; an accumulator into which said last-named means debouches, adapted to contain refrigerant at high temperature and pressure; a condenser coil adapted to have waste fluid flow thereacross for heat exchange with refrigerant flowing therethrough; a tempering coil across which air to be conditioned is adapted to flow for heat exchange with refrigerant flowing therethrough; means including duct means interconnecting said heat exchange coil in the super-cooler, said condensing coil and said tempering coil; means for restricting the flow of refrigerant out of said accumulator to a rate such as to maintain the refrigerant therein at a high pressure; and means including valve means for regulating the flow of hot refrigerant from said accumulator alternatively through said tempering coil, said heat exchange coil and said condenser coil serially for heating, or through said condenser coil, said heat exchange coil and said tempering coil serially for cooling.

14. A heating and cooling device of the character described, comprising: a boiler adapted to contain refrigerant at high temperature and pressure; means for heating liquid refrigerant in said boiler to vaporize the same and to super- heat the vapor to essential dryness; a nozzle fed by said boiler and from which refrigerant is expelled as a high velocity gaseous stream; a super-cooler vessel for holding refrigerant at low pressure; an ejector so disposed with respect to the nozzle that the high velocity stream of refrigerant from the nozzle passes therethrough; means interconnecting said super-cooler vessel and said ejector so that the passage of a high velocity stream through the ejector produces a low pressure in said vessel thereby causing refrigerant in said vessel to boil at low temperatures, and whereby vaporized refrigerant from the vessel will be educted into the stream of refrigerant flowing through said ejector; an injector so disposed with respect to the ejector that the high velocity stream passes therethrough; means interconnecting said super-cooler vessel and said injector whereby liquid refrigerant from said vessel will be educted into the high velocity stream flowing through said injector to promote condensation thereof; a high pressure accumulator into which the injector debouches the refrigerant of the high velocity stream as liquid refrigerant at high temperature and pressure; means defining a metered passage between said accumulator and the boiler to permit a portion of the refrigerant entering the accumulator to return to the boiler to replenish the supply of refrigerant therein; a primary heat exchange coil across which waste fluid is adapted to flow for exchange of heat with refrigerant in the coil; a super-cooler coil in said super-cooler vessel immersed in the liquid refrigerant therein and through which refrigerant is adapted to flow to impart heat to the liquid refrigerant in the vessel; means, including valve means communicating the interior of the super-cooler coil with the interior of the vessel for maintaining the level of the fluid in the vessel from refrigerant circulating through said coil; a tempering coil across which air from the enclosure to be air conditioned is adapted to flow for heat exchange with refrigerant flowing through the tempering coil; duct means interconnecting the accumulator, the primary heat exchanger, the super-cooler coil, the tempering coil and the ejector; and means including valve means for controlling the flow of refrigerant from said accumulator, alternatively to the tempering coil and thence serially to the super-cooler coil and the primary heat exchanger and back to the ejector during heating operation, or to the primary heat exchanger and thence serially through said super-cooler coil and the tempering coil and back to the ejector during cooling operation.

15. In a refrigerating apparatus; a boiler providing a source of high pressure high temperature gaseous refrigerant; means defining a circulatory system including a heat exchanger positioned to effect temperature conditioning of an objective and through which refrigerant may be circulated; duct means connected with the boiler inlet and the boiler outlet and with said circulatory system at two spaced points, said duct means including an injector positioned to have gaseous refrigerant from the outlet of the boiler flow therethrough and entrain wet refrigerant from the circulatory system; and an accumulator into which said injector debouches and in which the refrigerant is adapted to be stored as a liquid at high pressure so that the action of the injector effects liquification of the gaseous refrigerant and provides all of the pressure necessary for effecting circulation of the refrigerant through the system and return of the refrigerant to the boiler.

16. A refrigeration apparatus of the type wherein the circulatory system has a low pressure zone and a high pressure zone, the high pressure zone being connected with a power cell in which liquid refrigerant is heated to a gas under pressure, characterized by the provision of: an injector having its primary inlet connected with the power cell to receive gaseous refrigerant under pressure therefrom, its secondary inlet connected with the low pressure zone of the circulatory system, and its outlet connected with the high pressure zone of the circulatory system, so that the action of the injector effects propulsion of the refrigerant from the low pressure zone to the high pressure zone to maintain circulation through the circulatory system and return of part of the refrigerant to the power cell.

17. In a refrigeration apparatus of the type having a power cell in which liquid refrigerant is heated to a gas under pressure, and a circulatory system through which refrigerant is adapted to be circulated to effect refrigeration, characterized by the provision of: an injector having its primary inlet connected with the power cell to receive gaseous refrigerant under pressure therefrom, its secondary inlet connected with the circulatory system to draw refrigerant therefrom and create a low pressure zone therein, and its outlet connected with another portion of the circulatory system to deliver refrigerant thereto and create a high pressure zone in the system remote from the low pressure zone and of a pressure greater than that obtaining in the power cell, so as to effect circulation of refrigerant through the circulatory system; means restricting the flow of refrigerant out of said high pressure zone to maintain a high pressure upon the refrigerant therein; and duct means connecting the power cell with the circulatory system at a point therein remote from its low pressure zone for returning refrigerant to the power cell to maintain a predetermined liquid level therein.

18. A thermodynamic apparatus of the character described comprising: a power circuit including a power cell adapted to hold a supply of gaseous refrigerant under pressure; a temperature modifying circuit through which refrigerant is adapted to be circulated to effect temperature modification; an injector having its primary inlet connected with the power circuit to receive gaseous refrigerant under pressure and its secondary inlet connected with the temperature modifying circuit to draw refrigerant therefrom for admixture with the gaseous refrigerant; a high pressure accumulator into which said injector debouches, said accumulator having outlets in series with and common to both circuits; and means for restricting the flow of refrigerant out of said accumulator to maintain a higher pressure therein than in either of said circuits so that refrigerant will be circulated through both circuits by virtue of such pressure in the accumulator.

19. In a thermodynamic apparatus of the character described: a power cell adapted to contain a supply of refrigerant at a predetermined pressure; a super-cooler chamber adapted to contain a supply of refrigerant at low temperature and low pressure; an accumulator adapted to hold liquid refrigerant under high pressure; means for conducting a stream of refrigerant from said power cell to said accumulator; means including an ejector for conducting vaporous refrigerant from said super-cooler chamber and entraining the same in said stream of refrigerant to thereby maintain a low pressure on the refrigerant in said super-cooler chamber; and means for propelling the stream of refrigerant from the power cell, with the refrigerant from the super-cooler chamber entrained therein, into said accumulator against a refrigerant pressure in the accumulator higher than that in the power cell.

20. In the art of refrigeration, that improvement which comprises the steps of: maintaining refrigerant at a source thereof at a predetermined pressure; projecting a stream of gaseous refrigerant along a defined path from said source; reducing the pressure upon liquid refrigerant at another source thereof by entraining refrigerant therefrom in said stream of gaseous refrigerant; condensing the stream of gaseous refrigerant; propelling the condensed refrigerant into a chamber in which it is adapted to be held at high pressure; maintaining the pressure of the refrigerant in said chamber at a value higher than that at said first named source; and circulating the refrigerant from said chamber through a closed system including heat exchangers and back to said first named source, utilizing the pressure in said chamber to propel the fluid through the system.

NORMAN C. POWERS.

REFERENCES CITED

The following references are of record in the file of this patent:

UNITED STATES PATENTS

| Number | Name | Date |
|---|---|---|
| 2,046,319 | Bulkeley | July 7, 1936 |
| 2,088,609 | Randel | Aug. 3, 1937 |
| 2,172,408 | Randel | Sept. 12, 1939 |